United States Patent [19]

Moyer

[11] 3,817,958

[45] June 18, 1974

[54] OIL AND WATER REPELLENT

[75] Inventor: Robert Holden Moyer, Chadds Ford, Pa.

[73] Assignee: E. I. du Pont de Nemours and Company, Wilmington, Del.

[22] Filed: Nov. 22, 1972

[21] Appl. No.: 308,857

[52] U.S. Cl. ............... 260/86.7, 117/140, 117/155, 117/161, 260/29.6 F, 260/33.4 F, 260/33.8 F, 260/79.3 R, 260/80.73, 260/86.1 N, 260/86.3
[51] Int. Cl. ............................................ C08f 15/00
[58] Field of Search ..................... 260/86.7, 89.5 N

[56] References Cited
UNITED STATES PATENTS

| | | | |
|---|---|---|---|
| 3,239,496 | 3/1966 | Jursich | 260/89.5 N |
| 3,243,418 | 3/1966 | Shouse et al | 260/86.7 |
| 3,660,360 | 5/1972 | Ray-Chaudhuri et al | 260/86.7 |
| 3,661,880 | 5/1972 | Markert et al | 260/89.5 N |
| 3,664,990 | 5/1972 | Slagel | 260/86.1 N |

*Primary Examiner*—Harry Wong, Jr.

[57] ABSTRACT

A polymer salt of a linear polymer having a pendent cationic nitrogen-containing group and an anionic moiety having a pendent polyfluoroalkyl group, for example, a polymer salt of a protonated or quaternized copolymer of ethylene and 2-(N,N-dimethylamino)ethyl methacrylate and, as the anionic moiety, the anion of the salt diethanolammonium bis(-1H,1H,2H,2H-tridecafluorooctyl) phosphate, useful as an oil and water repellent for fibrous materials such as paper.

4 Claims, No Drawings

OIL AND WATER REPELLENT

BACKGROUND OF THE INVENTION

1. Field of the Invention

This invention relates to oil and water repellents for fibrous materials.

2. Description of the Prior Art

U.S. Pat. Nos. 3,083,224; 3,096,207; and 3,112,241 disclose polyfluoroalkyl phosphates which are useful as oil repellents and which can be represented by the formula

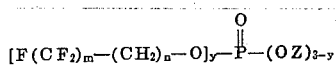

wherein $m$ is 3–12, $n$ is 1–16, $y$ is 1.0–2.5 (an average value) and Z is a water solubilizing cation. The exhaustibility of such phosphorus compounds onto fibrous materials can be enhanced by also applying to the substrate, either before, during or after treatment with the phosphorus compound, a water soluble linear polymer containing cationic nitrogen atoms.

DETAILED DESCRIPTION OF THE INVENTION

The present invention resides in polymer salts of a linear polymer having pendent cationic nitrogen-containing groups and an anionic moiety having pendent polyfluoroalkyl groups. Such salts are useful in imparting oil and water repellency to fibrous substrates such as textiles and paper products, especially paperboard. The preferred polymer salts are derived from a protonated or quaternized copolymer of ethylene and a monomer of the formula

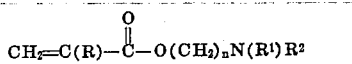

wherein R is H or $CH_3$, $R^1$ and $R^2$ are the same or different and are $C_{1-4}$ alkyl and $n$ is 2–2 and an anionic moiety which is derived from a salt of a polybasic acid which has been partially esterified with a $C_{6-25}$ polyfluoroalkanol. The polybasic acid salt preferably is an ester of a phosphoric acid, such as an ester of the formula

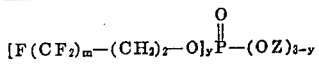

wherein $m$ is 6–14, $y$ is 1–2 (an average value) and Z is a water solubilizing cation. The aforesaid polymer salts are insoluble in water but soluble in many organic solvents. They can be applied as solvent dispersions or from solutions onto fibrous substrates such as textiles and paper products to impart oil and water repellency thereto.

There are readily available a number of known copolymers derived partially from monomers having a cationic character due to pendent basic nitrogen-bearing segments. Included among these monomers are alkylaminoalkyl acrylates, methacrylates or similar esters of other unsaturated aliphatic acids. These monomers can be copolymerized with ethylene, propylene, butene, vinyl esters, vinyl acids, vinyl amides, vinyl halides and the like. For use in preparing the salts of the present invention, the alkylamino groups of the copolymers are protonated, by reacting with an acid, or quaternized, by reacting with alkylating agents such as methyl chloride or dimethyl sulfate.

Copolymers of ethylene and alkylamino acrylates useful for preparing polymer salts of the invention contain 20–80 weight % of ethylene and 20–80 weight %, that is, the balance to obtain 100 weight %, of alkylamino acrylate monomer. Polymers containing less than 20 % of the basic function-bearing unit do not provide enough reaction sites to make functionally useful polymer salts. Included among the useful acrylate monomers are 2-(N,N-dimethylamino)ethyl acrylate and methacrylate, 2-aminoethyl acrylate and methacrylate, 2-(N,N-diethylamino)ethyl acrylate and methacrylate, 2-(N-methylamino)ethyl acrylate and methacrylate, 2-(N-t-butylamino)ethyl acrylate and methacrylate and 3-(N,N-dimethylamino)propyl acrylate and methacrylate. The preferred polymer contains 70% units derived from ethylene and 30% units derived from 2-(N,N-dimethylamino)ethyl methacrylate. Among useful known copolymers bearing a basic function in the form of pendent amino groups or alkylamino groups are copolymers consisting essentially of ethylene and an aminoalkyl acrylate having the general formula

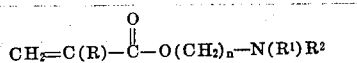

wherein R is H or $CH_3$, $R^1$ and $R^2$ are the same or different and are $C_{1-4}$ alkyl and n is 2–4, said copolymers containing 5–50 mole % of the polymerized acrylate.

Polyfluoroalkyl phosphates provide the source of the preferred anionic materials used in the preparation of the salts of this invention. To be useful herein the phosphate must provide an anionic moiety which can react with the cationic copolymer. Useful phosphates are disclosed in U.S. Pat. Nos. 3,083,224; 3,094,547; 3,096,207; 3,112,241; 3,188,340, 3,274,244; 3,293,306; and 3,492,374 and in Dutch Pat. No. 10946/70. Preferred phosphates include those of the formula

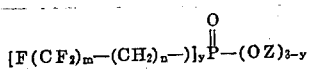

wherein $m$ is 3–12, $n$ is 1–16, $m + n$ is at least 8, $y$ is 1.0–2.0 (an average value) and Z is a water solubilizing cation such as H, alkali metal, ammonium or substituted ammonium cation. Operable alkali metal cations include Na, K and Li. Examples of substituted ammonium cations include diethanolammonium, triethanolammonium and morpholinium.

In addition to the phosphoric acid esters described above, polyfluoroalkyl carboxylic and sulfonic acids can be employed in the formation of the salts of this invention since such acids also can provide a source of an operable anionic moiety. Included among such polyfluoroalkyl acids are those having the formulas $R_fCO_2H$, $R_f(CH_2)_nX-(CH_2)_mCO_2H$, $R_fSO_3H$, $R_f(CH_2)_nSO_3H$ and $R_fCON(R)-R'-CO_2H$ wherein $R_f$ is perfluoroalkyl, m and n are integers, X is -O- or -S-, R is H or alkyl and R' is alkylene. Such acids are disclosed in U.S. Pat. Nos. 2,567,011; 2,732,398; 3,145,222; 3,172,910; and 3,238,235 and in Canadian Pat. No. 207,350.

An an example of an effective procedure for preparing the polymer salts of the invention, a solution or very fine dispersion of the protonated copolymer is prepared by mixing the copolymer, water and an acid having a dissociation constant greater than $10^{-5}$ (normally one of the familiar mineral acids) in a ratio sufficient to provide a solids content within the range of about 5–30 weight % (preferably 10–20 weight %) and a degree of neutralization of the polymer amine groups of at least 40%, at a temperature such that the copolymer will be dispersed into a particle size less than 0.1 micron. Generally, the temperature employed will increase with increasing ethylene content. When the ethylene content is at least 50 weight %, the mixture is heated above the melting point of the copolymer. The solids level will vary with the type of acid used and the degee of neutralization. The pH of the dispersion as prepared will be 3–6. After preparation the pH of the dispersion can be adjusted, especially downward to pH 1, without adversely affecting the dispersion. A preparation pH under 3 results in gelation of the dispersion whereas a preparation pH over 6 provides only a partial dispersion. Although vigorous stirring of the mixture is not required, it does decrease the time needed to form the dispersion. The copolymer particles in the dispersion are cationically charged and the particle size is less than 0.1 micron (to as low as 0.001 micron). Particle size depends on the temperature and the acid and copolymer used. Generally, the particle size will be within the range 0.01–0.05 micron. The degree of neutralization of the copolymer amine groups by strong acids should be at least 40%; it generally will be within the range of about 40–95%, preferably 60–70%. If the degree of neutralization is lower than about 40%, the particle size of the copolymer tends to become too large. With weak acids ($Ka<10^{-2}$) the degree of neutralization will also be 40–95%. However, it must be calculated from the theory of weak acids and weak bases rather than stoichiometry. The protonated copolymer is then contacted at 40°–80° C. with a sufficient amount of the anionic moiety to react with the protonated groups. The polymer salt which precipitates is collected, washed and dried.

The polymer salts of the invention are useful for imparting oil and water repellency to fibrous substrates, particularly paper such as paperboard. For this purpose the salt is dissolved and/or dispersed in a solvent (perchloroethylene and trichloroethylene are effective) and applied to the paper surface, thereafter allowing the solvent to evaporate. The treated paper exhibits good oil holdout and also good water repellency. The amount of polymer salt on the paper surface can be 0.05–0.5 lb./1,000 square feet of surface although higher concentrations may be useful in special cases.

In the following examples all parts are by weight unless otherwise indicated. Following are descriptions of evaluations employed herein and discussed in the examples.

The oil repellency test measures the resistance of paper to penetration by organic liquids. Drops of fluid hydrocarbons of various surface tensions are placed without impact on the paper surface. Beginning with the lowest numbered test liquid, drops are carefully deposited at several places on the test sheet. The drops should be on the side of the sheet which will be exposed to oil, grease or solvent in use. The drops are observed for 3 minutes if on paper and for 3 and 30 minutes if on board. If no penetration of the paper occurs (observing the underside of the paper), a drop of the next higher numbered test liquid is placed at an adjacent site on the paper and again observed for 3 and 30 minutes. The procedure is continued until one of the test liquids penetrates the paper. The oleophobic rating of the paper is the highest numbered test liquid which will not penetrate for a period of 3 minutes for paper and for 3 and 30 minutes for board. The oils and ratings employed in the oil repellency test are given in Table I.

TABLE I

| OILS FOR OLEOPHOBIC RATINGS | |
|---|---|
| Oil Components | Oleophobic Rating No. |
| Mineral Oil | 1 |
| 65/35 Mineral oil/n-hexadecane | 2 |
| n-Hexadecane | 3 |
| n-Tetradecane | 4 |
| n-Dodecane | 5 |
| n-Decane | 6 |
| n-Octane | 7 |
| n-Heptane | 8 |

In the lard holdout test a drop of molten lard is placed on the test paper and the paper is placed in a 140° F. oven for observation two times a day to see whether the lard has penetrated the paper and stained the underside. The grading is reported as time of holdout; a holdout of several days generally is considered good; at least 5 days holdout may be preferred for certain uses. In another functional test, oils from various sources are substituted for the lard of the previously described test and the paper is maintained at about 70° F. Peanut oil, corn oil and cottonseed oil were employed herein for this test. A holdout of 20 days is considered good.

The water repellency test employed is T441 OS-69 of the Technical Association of the Pulp and Paper Industry (TAPPI), sometimes called the Cobb Test. It measures water absorbency in grams per square meter of paper.

EXAMPLE 1

A. Preparation of Polymer Solution

100 Grams of a known 70/30 ethylene/2-(N,N-dimethylamino)ethyl methacrylate copolymer (prepared by process of Example 1 of U.S. Pat. No. 3,383,373) and 10 grams of 70% nitric acid were heated to the boil with agitation in one liter of water. Upon continued heating at the boil for a few minutes, a uniform dispersion resulted. The dispersion (9.6% solids) remained stable on subsequent cooling to room temperature. In this mixture about 70% of the amine sites of the copolymer were protonated with the acid.

B. Preparation of Polyfluoroalkyl Phosphate

42 Parts of a dry mixed polyfluoroalcohol having the formula $F(CF_2)_nCH_2CH_2OH$ where n is 6, 8, 10, 12 and 14 in the respective relative amounts 35:30:18:8.3 was charged into a suitable vessel. If not dry, the material was dried by removing water by azeotropic distillation with benzene. When dry, the temperature was adjusted to 70°–85° C. and 4.0 parts of phosphoric anhydride were added gradually with agitation over a 3–4 hour period. The temperature was raised to 85°–95° C. and agitation was continued for 20 hours. The charge was cooled to 65°–75° C. and 11.1 parts of anhydrous isopropanol were added, followed by stirring for about 1 hour, after which the charge was cooled to 45°–55° C.

In a second vessel 59.4 parts of deionized water were mixed with 9.3 parts of diethanolamine and the phosphated mixture was added thereto. The charge was heated at 65°–75° C. for about 1 hour and then cooled to 25°–35° C. Finally, 16.1 parts of 1,1,2-trichloro-1,2,2-trifluoroethane were added, and after stirring for 1 hour, the product was ready to use in the next step.

C. Preparation of Polymer Salt

To 100 ml. of the prepared polymer solution containing 9.6% solids were added 6.1 ml. of 1N nitric acid to complete protonation of all amine functional groups (equivalent to 0.02 mole of protonated sites). The solution was warmed to 50° C. and added to 50.6 grams of the diethanolamine phosphate composition (0.02 mole, 17.7 grams of solids) previously diluted with 150 ml. of water and warmed to 50° C. A solid precipitate formed immediately. After all of the polymer solution has been added, the mixture was stirred at about 50° C. for 15 minutes and then cooled to room temperature. The solid product was removed by filtration and washed with two 200 ml. portions of deionized water, then dried first in air and finally in a vacuum desiccator for 8 hours.

The dried polymer salt of this invention weighed 20.8 grams.

D. Application of Polymer Salt to Paperboard

A 10 gram sample of the dry product of Part C was dissolved by heating in trichloroethylene and cooled to make a uniform dispersion-solution (4.53 weight % salt). The dispersion-solution was diluted with additional trichloroethylene to provide a less viscous product for application to paper. It was applied to one side of solid bleached sulfate Kraft paperboard by padding; the paperboard was then wrung out to give the desired add-on. After drying in air, the treated paper was treated for oil repellency, for lard holdout and for water repellency. The results are given in Table II.

TABLE II

Repellency of Treated Paperboard

| | | | |
|---|---|---|---|
| Add-on of polymer salt, % of dry paperboard weight | 0.31 | 1.49 | 2.65 |
| Rating No. of 3 minute oil holdout | 1 | 4 | 6 |
| Rating No. of 30 minute oil holdout | 0 | 3 | 5 |
| Lard holdout at 140°F. | 5 minutes | 120 minutes | 2 days |

EXAMPLE 2

A suspension of 25 parts of a 70/30 ethylene/2-(N,N-dimethylamino)ethyl methacrylate copolymer, 225 parts of water and 2.95 parts of 70% nitric acid was heated at the boil under reflux for 1 hour and then cooled. The resultant stable dispersion contained copolymer which was 68% protonated. An additional 1.35 parts of 70% nitric acid in 25 parts of water were added with stirring (to achieve 100% protonation) and the dispersion was heated at about 50° C. for 30 minutes. The copolymer dispersion (279 parts) was added to 89.2 parts of the diethanolamine-phosphate composition of Example 1, Part B, at about 50° C. with rapid stirring. The fluorinated phosphate/polymer salt which separated as a granular, almost white solid was isolated by filtration, washed with water and dried at 40° C. under reduced pressure to a water content of less than 0.6%. Fluorine content of the dry salt was 32.1%. Ten parts of the dry polymer salt were dissolved in 190 parts of perchloroethylene by heating with stirring at about 80° C. Upon cooling to room temperature a uniform syrup-like dispersion-solution was obtained. A series of dispersion-solutions containing up to 10% salt was prepared; the higher concentration dispersion-solutions were difficult to handle because of their high viscosities.

Perchloroethylene dispersion-solutions were applied to paperboard using a wire wound rod to spread the composition evenly over the surface of the paperboard. After application, the board was dried at 180° F. for 1 minute. Results of repellency tests on the treated paperboard are shown in Table III. In order to calculate the application level in terms familiar to the paper industry (lbs. per 1,000 sq. ft.), the following formula was used (assuming the size of the paperboard sample to be 96 sq. in.):

Weight in grams of wet composition on paper/96 - area not coated × 144/454 × 1,000 = lbs./1,000 sq. ft.

TABLE III

| Solvent | Dispersion Conc.(%) | Wet Pickup lb./1,000 sq. ft. | Repellency Tests on Paperboard | | Oils at 70°F | | | Cobb Test g./sq. meter (in 1 Minute) |
|---|---|---|---|---|---|---|---|---|
| | | | 3, 30 min. Oil Test | 140°F. Lard Test | Peanut | Corn | Cottonseed | |
| Perchloroethylene | 5.09 | 3.37 | 7, 6 | 5–20 hours | 21 days | 30+ days | 30+ days | 0.16 |
| Perchloroethylene | 2.55 | 5.78 | 7, 5 | 1–16 hours | 30 days | 30+ days | 30+ days | 0.22 |
| Untreated Paperboard | — | — | 0, 0 | immediate | — | immediate | — | 0.37 |

EXAMPLE 3

A. A polymer salt of lower fluorine content was prepared by adding 248 parts of the 68% protonated copolymer dispersion of Example 2 (containing 9.6% solids) to 88.2 parts of the diethanolamine-phosphate composition of Example 1, Part B, in 255 parts of water. There were obtained 44.3 parts of dry, nearly white, solid product after isolating, washing and drying as in Example 2. Fluorine content was 27.6% by analysis. Solution-dispersions of the product in perchloroethylene were prepared as described in Example 2.

B. Using the same proportion of ingredients as in Part A, a polymer salt product was prepared by adding the diethanolamine-phosphate composition to the 68% protonated copolymer dispersion. After filtration, washing and drying, the product was found to have a fluorine content of 23.1%. Solution-dispersions of this product in perchloroethylene were prepared as before.

C. The uniform solution-dispersions of the products of Parts A and B were applied to paperboard and the treated board was treated for oil and water repellency. Results of the tests are shown in Table IV.

cooled. Next, 22.4 parts of the solution were added to 90 parts of water, precipitating the polymer as a viscous mass. The solid was dissolved at 50° C. by adding 47.5 parts of 1N hydrochloric acid and the solution was

TABLE IV

| | | | Repellency Tests on Paperboard | | | | | Cobb Test |
|---|---|---|---|---|---|---|---|---|
| Solvent | Dispersion Conc. (%) | Wet Pickup lb./1,000 sq. ft. | 3, 30 Min. Oil Test | 140°F. Lard Test | Oils at 70°F. | | | g./sq. meter (in 1 Minute) |
| | | | | | Peanut | Corn | Cottonseed | |
| Part A | | | | | | | | |
| Perchloro-ethylene | 4.98 | 2.70 | 6, 5 | 3–5 days | 30 days | 30 days | 30 days | 0.17 |
| Perchloro-ethylene | 2.49 | 2.16 | 7, 5 | 3–5 days | 30 days | 30 days | 30 days | 0.22 |
| Part B | | | | | | | | |
| Perchloro-ethylene | 4.97 | 2.52 | 8, 6 | 2 days | 30 days | 30 days | 30 days | 0.19 |
| Perchloro-ethylene | 2.49 | 3.60 | 5, 5 | 3–5 days | 30 days | 30 days | 30 days | 0.20 |
| Untreated Paperboard | — | — | 0,0 | immediate | — | immediate | — | 0.37 |

Example 4

A 74/26 ethylene/2-(N,N-dimethylamino)ethyl methacrylate copolymer was prepared as described in Example 1, Part A. The copolymer in a 9.5% aqueous dispersion was 100% protonated using hydrochloric acid. A polymer salt of the invention was prepared by adding 221 parts of the polymer dispersion to 93.6 parts of the diethanolamine-phosphate composition of Example 1, Part B, in 270 parts of water at about 50° C. There resulted 42.0 parts of a polymer salt which after washing and drying contained 33.3% fluorine. A uniform solution-dispersion of the polymer salt in trichloroethylene was prepared and applied to paperboard and then tested. Results are shown in Table V.

added to a solution of 131.5 parts of the diethanolamine-phosphate composition of Example 1, Part B, in 375 parts of water to precipitate the polymer salt. After washing the solid salt and drying in a vacuum oven there were obtained 29.8 parts of product containing 46.3% fluorine.

B. A terpolymer was prepared as in Part A from a monomer mixture containing 25 parts of 2-(N,N-diethylamino)-methyl methacrylate, 25 parts of methyl methacrylate and 50 parts of butyl methacrylate. In a suitable vessel the monomer mixture was combined with 50 parts of isopropyl alcohol and 0.2 part of dodecyl mercaptan and heated to 75°–80° C. There was then added 0.1 part of azobisisobutyronitrile polymerization

TABLE V

| | | | Repellency Tests on Paperboard | | | | | Cobb Test |
|---|---|---|---|---|---|---|---|---|
| Solvent | Dispersion (%) | Wet Pickup lb./1,000 sq. ft. | 3, 30 Min. Oil Test | 140°F. Lard Test | Oils at 70°F. | | | g./sq. meter (in 1 Minute) |
| | | | | | Peanut | Corn | Cottonseed | |
| Trichloro-ethylene | 0.25 | 4.98 | 1.63 | 5, 4 | 35 min. | 23+ days | 23+ days | 23+ days |
| Untreated Paperboard | — | — | 0.37 | 0, 0 | immediate | — | immediate | — |

EXAMPLE 5

A. In a dry vessel were mixed 24 parts of 2-(N,N-diisopropylamino)ethyl methacrylate and 8 parts of decyl methacrylate. ethylemethacrylate. The charge was blanketed with nitrogen and to it was added 0.32 part of a 50% solution of azobisisobutyronitrile catalyst in dimethylacetamide. The charge was heated at about 75° C. for 2 hours, then at about 80° C. for 4 hours. After each of the first and second hours there were added an additional 6 parts of 2-(N,N-diisopropylamino)ethyl methacrylate, 2 parts of decyl methacrylate and 0.32 part of the azobisisobutyronitrile solution. After each of the third, fourth and fifth hours there were added, respectively, 0.26, 0.07 and 0.07 part of the catalyst solution. After heating, the charge was diluted to 60% polymer content by adding N,N-dimethylacetamide and the resulting solution was catalyst. The charge was held at about 80° C. for 6 hours, additional 0.1 part portions of polymerization catalyst being added after 1, 2 and 4 hours of heating. After completion of the polymerization the charge was cooled and there were added to it 100 parts of 50% aqueous acetic acid and 100 parts of 50% aqueous isopropyl alcohol; polymer content was 31.1%. 89 Parts of the polymer solution were added at 50° C. to 195 parts of water and the resulting solution was added to 65.8 parts of the diethanolamine-phosphate composition of Example 1, Part B, in 190 parts of water. The rubbery polymer salt that precipitated was stirred in water in a high shear mixer, then filtered, washed with water and dried in a vacuum oven. There were obtained 42.6 parts of product containing 27.3% fluorine.

C. A monomer mixture the same as employed in Part B was partially quaternized by adding 68 parts of dimethyl sulfate and holding the mixture at about 70° C.

for about 4 hours. After cooling to 50° C., 0.2 part of dodecyl mercaptan and 50 parts of isopropyl alcohol were added and the charge was heated to 75°–80° C. under nitrogen. When the charge reached 75° C., 0.1 part of azobisisobutyronitrile catalyst was added with an additional 0.1 part being added after 1, 2, and 4 hours. The temperature was held at 75°–80° C.; after 4 hours, 55.2 parts of 10% aqueous acetic acid were added, followed by 100 parts of 50% aqueous isopropyl alcohol; the solution was allowed to cool. Polymer content was 34%. After diluting 82.0 parts of this solution with 215 parts of water, the dilute solution was mixed with 65.8 parts of the diethanolamine-phosphate composition of Example 1, Part B, in 190 parts of water at 50° C. There were obtained 22.5 parts of polymer salt after washing and drying. The salt contained 30.8% fluorine.

D. Solution-dispersions of the products of Parts A, B and C were prepared and they were applied to paperboard and tested. The test results are shown in Table VI.

dride. Temperature was maintained at 45°–55° C. After the addition was completed, the temperature was raised to about 65° C. and held there for 12 hours. The charge was cooled to 25°–30° C. and to it were added 19.25 parts of 40% aqueous potassium hydroxide, cooling as necessary to keep the temperature at about 60°–70° C. The pH was adjusted to 7.6–7.9 by adding potassium hydroxide as required. The solids content was adjusted to 70% by adding water; the active ingredients include monooctyl and bisoctyl phosphates.

B. A solution was prepared by mixing 7.7 parts of the composition of Part A in 375 parts of water with 92.0 parts of the fluoroalkyl phosphate composition of Example 1, Part B. To this solution were added 263 parts of the 100% protonated polymer dispersion (9.6% solids) of Example 2. The resulting granular precipitate was washed and dried to give 46.9 parts of polymer salt containing 30.1% fluorine.

C. The procedure of Part B was repeated using 11.55 parts of the n-octyl phosphate composition of Part A and 69.0 parts of the diethanolamine-phosphate com-

TABLE VI

| | | | Repellency Tests on Paperboard | | | | | Cobb Test |
|---|---|---|---|---|---|---|---|---|
| | Dispersion | Wet Pickup | 3, 30 Min. | 140°F. | Oils at 70°F. | | | g./sq. meter |
| Solvent | Conc. (%) | lb./1,000 sq. ft. | Oil Test | Lard Test | Peanut | Corn | Cottonseed | (in 1 Minute) |
| Part A | | | | | | | | |
| Perchloroethylene | 4.87 | 4.93 | 6, 5 | 12–14 days | 30+ days | 30+ days | 30+ days | 0.21 |
| Part B | | | | | | | | |
| Perchloroethylene | 4.95 | 4.14 | 8, 8 | 2 days | 30+ days | 30+ days | 30+ days | 0.20 |
| Perchloroethylene | 2.48 | 5.94 | 7, 7 | 6 days | 30+ days | 30+ days | 30+ days | 0.29 |
| Trichloroethylene | 5.15 | 3.0 | 8, 8 | 3–5 days | 30+ days | 30+ days | 30+ days | 0.17 |
| Part C | | | | | | | | |
| Trichloroethylene | 5.11 | 0.87 | 8, 8 | 4 days | 30+ days | 30+ days | 30+ days | 0.22 |
| Trichloroethylene | 2.56 | 0.97 | 8, 8 | 14 days | 30+ days | 30+ days | 30+ days | 0.23 |
| Untreated Paperboard | — | — | 0, 0 | immediate | — | immediate | — | 0.37 |

EXAMPLE 6

A. A non-fluorinated alkyl phosphate composition was prepared as follows. To 19.48 parts of dry n-octyl alcohol in a suitable vessel were added slowly and steadily, with cooling, 7.80 parts of phosphoric anhyposition of Example 1, Part B. There were obtained 45.8 parts of polymer salt containing 24.2% fluorine.

D. The products of Parts B and C, as solution-dispersions, were applied to paperboard and tested. The test results are shown in Table VII.

TABLE VII

| | | | Repellency on Paperboard | | | Cobb Test |
|---|---|---|---|---|---|---|
| | Dispersion | Wet Pickup | 3, 30 Min. | 140°F. | | g./sq. meter |
| Solvent | Conc. (%) | lb./1,000 sq. ft. | Oil Test | Lard Test | Peanut Oil at 70°F. | (in 1 Minute) |
| 1/4 Part B | | | | | | |
| Trichloroethylene | 5.0 | 0.72 | 6, 5 | 1–3 days | 30+ days | 0.18 |
| Trichloroethylene | 2.5 | 2.05 | 6, 5 | 1–3 days | 30+ days | 0.22 |
| Trichloroethylene | 1.5 | 2.95 | 5, 4 | 4–20 hrs. | 21 days | 0.22 |
| Trichloroethylene | 1.0 | 4.25 | 5, 4 | 4–20 hrs. | 5 days | 0.26 |
| Trichloroethylene | 0.5 | 5.58 | 3, 2 | 4–20 hrs. | 5 days | 0.22 |

TABLE VII

| Solvent | Dispersion Conc.(%) | Wet Pickup lb./1,000 sq. ft. | Repellency on Paperboard | | | Cobb Test g./sq. meter (in 1 Minute) |
| | | | 3, 30 Min. Oil Test | 140°F. Lard Test | Peanut Oil at 70°F. | |
| --- | --- | --- | --- | --- | --- | --- |
| Part C | | | | | | |
| Trichloro-ethylene | 5.06 | 2.90 | 6, 5 | 8–20 hrs. | 24+ days | 0.16 |
| Trichloro-ethylene | 2.53 | 3.85 | 6, 5 | 8–20 hrs. | 24+ days | 0.23 |
| Untreated | — | — | 0, 0 | immediate | immediate | 0.37 |
| 18 Paperboard | | | | | | |

EXAMPLE 7

A mixture of perfluorocarboxylic acids of formula $F(CF_2)_n$-COOH where n is 5, 7 and 9 with small amounts of 3, 11 and 13 (average value of n is 7.6) was prepared as disclosed by Hauptschein et al. in U.S. Pat. No. 3,351,644. The acids were converted to their ammonium salts by dissolving 245 grams of the mixture in 1,100 ml. of 1,1,2-trichloro-1,2,2-trifluoroethane and bubbling in 13 grams of ammonia. The ammonium salts precipitated at once; they were isolated by filtration and dried. In a suitable vessel 11.6 parts of the ammonium salts in 175 parts of water at 50° C. were mixed with 138 parts of the 100% protonated polymer dispersion (9.6% solids) of Example 2. The polymer salt precipitated at once. After washing and drying there were obtained 23.8 parts of a polymer salt which contained 32.2% fluorine. The polymer salt was dissolved and/or dispersed in trichloroethylene, applied to paperboard and tested. The test results are shown in Table VIII.

nized copolymer of ethylene and the monomer of the formula

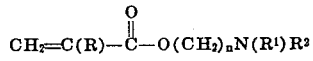

wherein R is H or $CH_3$, $R^1$ and $R^2$ are the same or different and are $C_{1-4}$ alkyl and n is 2–4 and an anion of the formula

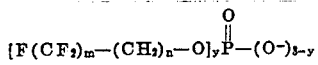

wherein m is 3–12, n is 1–16, m + n is at least 8 and y is 1–2.

2. Salt of claim 1 wherein m + n is 6–25.

3. Salt of claim 1 admixed with the salt of said cation and a phosphate anion which is free of fluorine atoms.

TABLE VIII

| Solvent | Dispersion Conc. (%) | Wet pickup lb./1,000 sq. ft | Repellency on Paperboard | | | | | Cobb Test g./sq. meter (in 1 Minute) |
| | | | 3, 30 Min. Oil Test | 140°F. Lard Test | Peanut | Oils at 70°F. Corn | Cottonseed | |
| --- | --- | --- | --- | --- | --- | --- | --- | --- |
| Trichloro-ethylene | 5.68 | 5.23 | 5, 4 | 2–16 hrs. | 28+ days | 28 days | 28+ days | 0.22 |
| Trichloro-ethylene | 2.84 | 6.50 | 3, 2 | 2–16 hrs. days | 4 days | 6 days | 6 | 0.26 |
| Untreated | — | — | 0, 0 | immediate | — | immediate | — | 0.37 |
| 18 Paper-board | | | | | | | | |

The embodiments of the invention in which an exclusive property or privilege is claimed are defined as follows:

1. Salt of a cation which is a protonated or quater-

4. Salt of claim 1 wherein each of R, $R^1$ and $R^2$ is $CH_3$, m is 3–12, y is 1–2 and n in both the cation and anion is 2.

* * * * *